(12) United States Patent
Yin

(10) Patent No.: US 7,333,353 B2
(45) Date of Patent: Feb. 19, 2008

(54) ISOLATING TYPE SELF-OSCILLATING FLYBACK CONVERTER WITH A SOFT START LOOP

(76) Inventor: Xiangyang Yin, Fl. 8, Bld. No. 8, Huangzhou Industrial District Chebei Road, Tianhe District, Guangzhou, Guangdong Province (CN) 510660

( * ) Notice: Subject to any disclaimer, the term of this patent is extended or adjusted under 35 U.S.C. 154(b) by 66 days.

(21) Appl. No.: 10/567,668

(22) PCT Filed: Aug. 30, 2004

(86) PCT No.: PCT/CN2004/001000

§ 371 (c)(1),
(2), (4) Date: Feb. 9, 2006

(87) PCT Pub. No.: WO2005/027331

PCT Pub. Date: Mar. 24, 2005

(65) Prior Publication Data

US 2006/0209573 A1    Sep. 21, 2006

(30) Foreign Application Priority Data

Sep. 16, 2003   (CN)   ................ 03 2 74572

(51) Int. Cl.
*H02M 7/5375* (2006.01)
(52) U.S. Cl. ........................ 363/49; 363/131
(58) Field of Classification Search ............... 363/18, 363/19, 49, 131
See application file for complete search history.

(56) References Cited

U.S. PATENT DOCUMENTS 4,208,705 A * 6/1980 Hosoya ................ 363/19

(Continued)

FOREIGN PATENT DOCUMENTS

JP    7007943 A    1/1995

(Continued)

OTHER PUBLICATIONS

International Search Report re PCT-CN2004-001000 dated Nov. 25, 2004.

*Primary Examiner*—Jeffrey Sterrett
(74) *Attorney, Agent, or Firm*—Bei & Ocean; George G. Wang

(57) ABSTRACT

An isolating type self-oscillating flyback converter is disclosed, which includes a coupled transformer, a FET, a transistor and an electro-optical coupled isolating feedback unit, wherein the input terminal of the circuit is connected to the source of the FET through a primary winding of the coupled transformer, the input terminal of the circuit is connected to the collector of the transistor through a resistor R1 and another resistor R2, the source of the FET is connected to the collector of the transistor, one branch of the drain of the FET is connected to the ground through a resistor, while the other branch is connected to the base of the transistor through the parallel connection body of a resistor and a capacitor, the base of the transistor is connected to the output terminal of a secondary output winding of the coupled transformer through the electro-optical coupled isolating feedback unit; the series connection joint between the said resistor R1 and the said resistor R2 is connected to the ground through a speedup capacitor and a secondary winding of the coupled transformer; a loop for implementing the soft start is connected between the said input terminal of the circuit and the series connection joint. Thus the start current of the invention is small and the converter can keep working normally when the input voltage is high.

6 Claims, 2 Drawing Sheets

U.S. PATENT DOCUMENTS 4,361,865 A * 11/1982 Shono .................. 363/19
4,486,822 A * 12/1984 Marinus ............... 363/19
4,700,280 A * 10/1987 Onda et al. ........... 363/19
4,937,724 A *  6/1990 Nakajima ............ 363/56.1
6,072,702 A *  6/2000 Nakao et al. .......... 363/19
6,178,100 B1 *  1/2001 Kitano ................ 363/19

FOREIGN PATENT DOCUMENTS

| JP | 2000152627 A | 5/2000 |
| JP | 2000262056 A | 9/2000 |

* cited by examiner

ISOLATING TYPE SELF-OSCILLATING FLYBACK CONVERTER WITH A SOFT START LOOP

BACKGROUND OF THE INVENTION

The present invention relates to an isolating type self-oscillating flyback converter used in a self-oscillating flyback power module.

A conventional isolating type self-oscillating flyback converter includes a coupled transformer, a FET (Field-Effect Transistor), an oscillating transistor and an electro-optical coupled isolating unit. As shown in FIG. 1, after applying voltage to the input terminal, the current directly flows through resistors R1 and R2 to make the FET TR1 tend to be conductive. When there is a current flowing through the primary winding P1 of the coupled transformer, the polarity of the secondary winding P2 produced by the coupling effect makes the conductivity of the FET TR1 increase further. The positive voltage of the secondary winding P2 is initially transmitted to the FET TR1 through a speedup capacitor C1 and a resistor R2, therefore, the front edge of the waveform of the driving current is very steep, which facilitates quick conduction of the FET. After the FET TR1 becoming conductive, the current that flows through the primary winding P1 and transistor TR2 results in a voltage drop on a resistor R4, and the polarity of said resistor, which is positive at the upper end and negative at the lower end, makes the transistor TR2 become conductive through resistor R3 and capacitor C2. After the transistor TR2 becoming conductive, it makes the gate of the FET TR1 shunt, and the FET TR1 will close off. After the FET TR1 being closed off, the current flowing through its drain is zero, so that the voltage drop on the resistor R4 is zero, the transistor TR 2 will be closed off, and the FET TR1 will become conductive again. As above described process recycles, self-oscillation will be generated in the circuit. After start-up of self-oscillation, the circuit will generate flyback. The output terminal controls the current on the base of the transistor TR2 according to the feedback of the phototriode of the electro-optical coupled isolating unit, so as to regulate FET TR1 and transistor TR2. This is the current flyback process of the circuit.

Since transistor TR1 is started up directly by the voltage on resistors R1 and R2 in said circuit, the start current is quite high. In addition, when the input voltage is high and at the moment that the voltage is just applied, there will appear a very high instantaneous current spike on the resistors R1 and R2, which makes the transistor momentarily become conductive, and the current spike of this moment may strike through the transistor; meanwhile, the high voltage applied on the transistor may cause damage to the transistor, and therefore cause the bad start problem of the product.

BRIEF SUMMARY OF THE INVENTION

The purpose of this invention is to provide an isolating type self-oscillating flyback converter, which has small start current and can work normally when the input voltage becomes high.

The purpose of this invention can be accomplished by the following technical means including a coupled transformer T, a FET TR1, an oscillating transistor TR2 and an electro-optical coupled isolating feedback unit OP, wherein the input terminal of the circuit is connected to the source of the FET TR1 through a primary winding P1 of the coupled transformer T, the input terminal of the circuit is connected to the collector of the transistor TR2 through resistors R1 and R2, the source of the FET TR1 is connected to the collector of the transistor, one branch of the drain of the FET TR1 is connected to the ground through a resistor R4 and another branch is connected to the base of the transistor TR2 through a parallel connection unit of a resistor R3 and a capacitor C2, the base of the transistor TR2 is connected to the output terminal of a secondary output winding P3 of the coupled transformer T through the electro-optical coupled isolating feedback unit OP; a series connection joint A between the said resistors R1 and R2 is connected to the ground through a speedup capacitor C1 and a secondary winding P2 of the coupled transformer T; and it is characterized in that a loop for implementing the soft start is connected between the said input terminal of the circuit and the series connection joint A.

The soft start loop of the present invention comprises the resistor R1, a resistor R5 and a capacitor C3, wherein the resistor R5 is connected between the said resistor R1 and the series connection joint A in series, and one terminal of the capacitor C3 is connected between the resistors R5 and R1, while another terminal is connected to the ground.

The soft start loop of the present invention comprises the resistor R1 and an inductance L, said resistor R1 and said inductance L is connected between the input terminal of the circuit and the series connection joint A in series.

Comparing with the prior all, the present invention has the following advantages: 1. the start current of the circuit is quite small because of the soft start loop added in, and no matter whether the load is a high load or a capacitor load, only very small start current will be generated, thus improving the start feature of the circuit; 2. there is no requirement for the input voltage, and the circuit can work normally when the input voltage is high.

DETAILED DESCRIPTION OF THE PREFERRED EMBODIMENT

Figure 2:
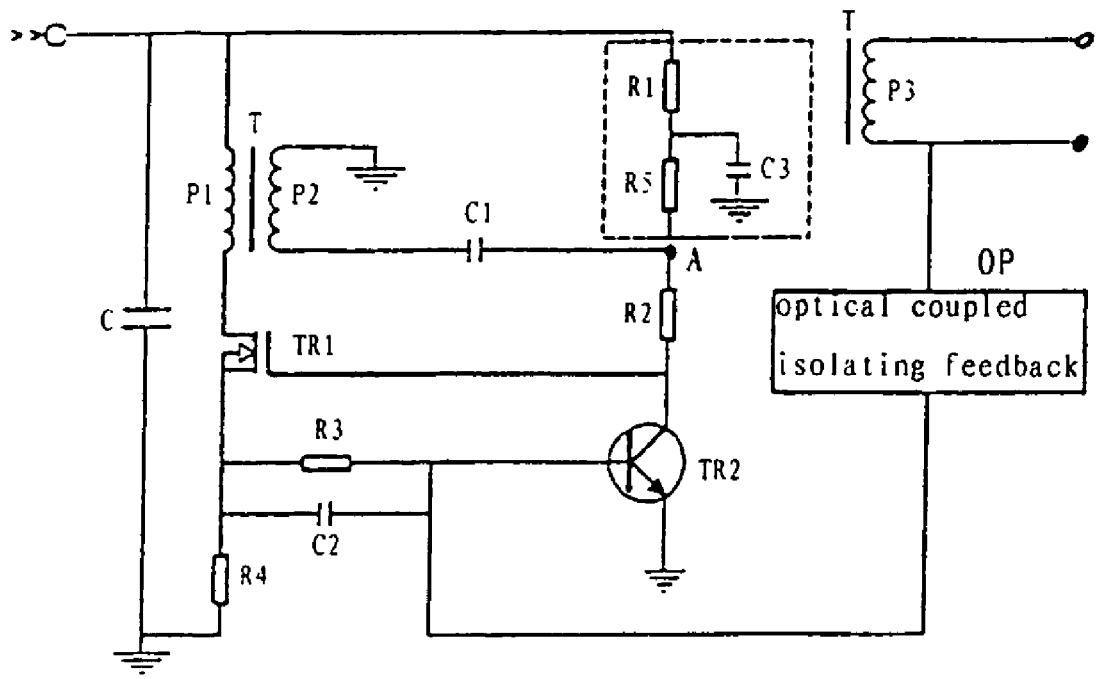
FIG. 2 is a circuit structure diagram of one embodiment of the present invention.

As shown in FIG. 2, the first embodiment of the present invention includes a coupled transformer T, a FET TR1, an oscillating transistor TR2 and an electro-optical coupled isolating feedback unit OP; wherein the input terminal of the circuit is connected to the source of the FET TR1 through a primary winding P1 of the coupled transformer T; the input terminal of the circuit is connected to the collector of the transistor TR2 through resistors R1 and R2; the source of the FET TR1 is connected to the collector of the transistor TR2; one branch of the drain of the FET TR1 is connected to the ground through a resistor R4, and the other branch is connected to the base of the transistor TR2 through the parallel connection unit of the resistor R3 and the capacitor C2; the base of the transistor TR2 is connected to the output terminal of a secondary output winding P3 of the coupled transformer T through the electro-optical coupled isolating feedback unit; the series connection joint A between the said resistor R1 and the resistor R2 is connected to the ground through a speedup capacitor C1 and a secondary winding P2 of the coupled transformer T; a resistor R5 is connected between the resistor R1 and the series connection joint A in series, and one terminal of the capacitor C3 is connected between resistors R5 and R1, while another terminal is connected to the ground.

Figure 1:
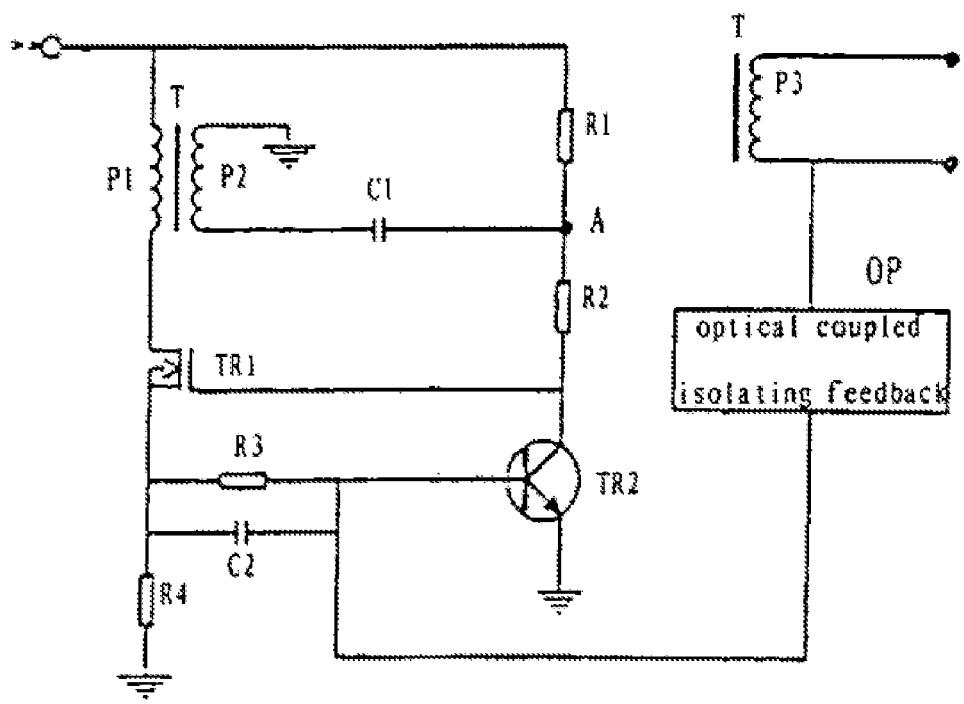
FIG. 1 is a circuit structure diagram of a conventional isolating type self-oscillating flyback converter.

When applying a voltage to the input terminal of the circuit, the current, filtered by the capacitor C, flows through the resistor R1 to charge the capacitor C3. During an initial short time interval after applying the voltage, the FET TR1 will not immediately become conductive, because the capacitor C3 is under charging state, as a result, there is no peak current generated. Only when the capacitor C3 is charged to a certain voltage, could the FET TR1 be conductive, and the length of said time interval can be chosen based on the parameter of the capacitor C3. When the capacitor C3 has already been charged for a certain time, the voltage of the collector of the transistor TR2 will increase, that is to make the gate voltage of the FET TR1 increase and thus make the FET become conductive, and other principles are the same as those of FIG. 1. As a result, the transistor can be controlled to be conductive when the input current and voltage become stable by choosing the parameter of the resistor R1, the resistor R5 and the capacitor C3, so as to greatly improve the start feature of said circuit. Meanwhile, the structure of said circuit can ensure the voltage added to the gate of the FET TR1 and the base of the triode TR2 will not exceed their respective limits.

Figure 3:
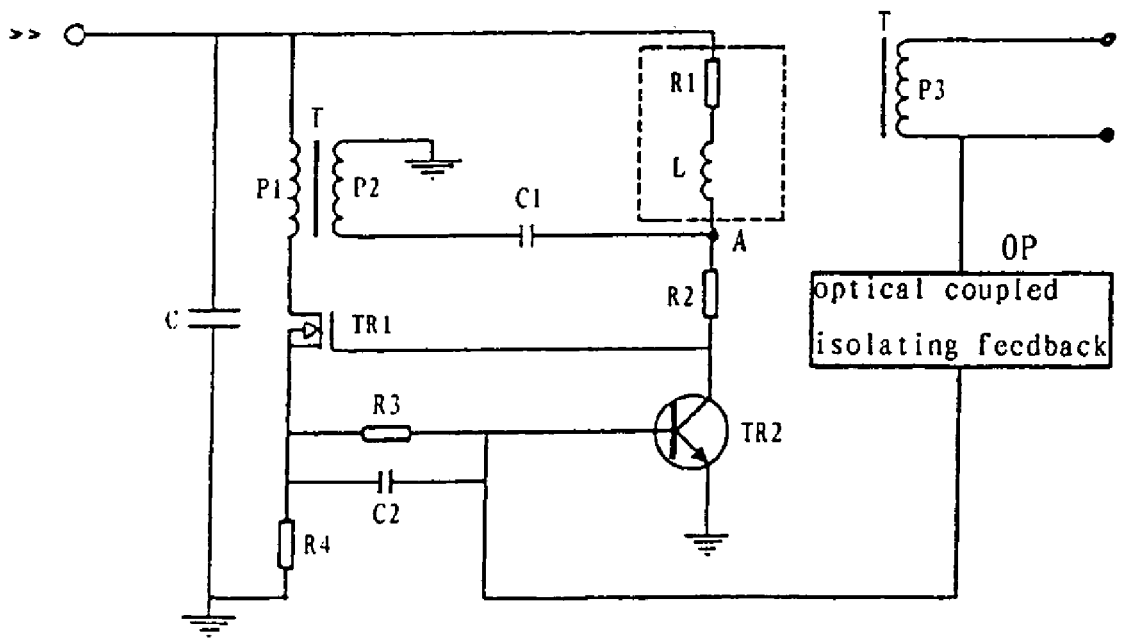
FIG. 3 is a circuit structure diagram of another embodiment of the present invention.

As shown in FIG. 3, the structure and working principle of the second embodiment of present invention are the same as those of the first embodiment, while their difference lies in the soft start loop. The soft start loop of the second embodiment comprises of an resistor R1 and an inductance L, and said resistor R1 and said inductance L are connected between the input terminal of the circuit and a series connection joint A in series. At first, the input voltage charges the inductance L; after the charging process having been maintained for a certain period, the current on the resistor R2 will reach a fixed value, and then the triode will become conductive; and this can achieve the soft start effect so as to protect the transistors TR1 and TR2, and to obtain similar effect.

What is claimed is:

1. An isolating type self-oscillating flyback converter, comprising a coupled transformer, a FET, an oscillating transistor and an optical-electro coupled isolating feedback unit, wherein the input terminal of said converter is connected to the source of said FET through a primary winding of said coupled transformer, said input terminal of said converter is connected to the collector of said oscillating transistor through a first resistor and a second resistor, said source of said FET is connected to said collector of said oscillating transistor, one branch of the drain of said FET is connected to the ground through a third resistor and another branch is connected to the base of said oscillating transistor through a parallel connection unit of a resistor and a capacitor, and said base of said oscillating transistor is connected to the output terminal of a secondary output winding of said coupled transformer through said electro-optical coupled isolating feedback unit; and there is a series connection joint between said first resistor and said second resistor connected to the ground through a speedup capacitor and a secondary winding of said coupled transformer; wherein a soft start means of said converter is connected between said input terminal of said converter and said series connection joint; and wherein said soft start means either comprises said first resistor, a fourth resistor and a capacitor, said fourth resistor is connected between said first resistor and said series connection joint in series, and one terminal of said capacitor is connected between said first resistor and said fourth resistor, while another terminal is connected to the ground, or comprises said first resistor and an inductance, and said first resistor and said inductance are connected between said input terminal of said converter and said series connection joint in series.

2. An isolating type self oscillating flyback converter according to claim 1, wherein said soft start means comprises said first resistor, a fourth resistor and a capacitor, said fourth resistor is connected between said first resistor and said series connection joint in series, and one terminal of the said capacitor is connected between said first resistor and said fourth resistor, while another terminal is connected to the ground.

3. An isolating type self oscillating flyback converter according to claim 1, wherein said soft start means comprises said first resistor and an inductance, and said first resistor and said inductance are connected between said input terminal of said converter and said series connection joint in series.

4. An isolating type self-oscillating flyback converter, comprising an input terminal, a coupled transformer having a secondary winding, a FET having a gate terminal, an oscillating transistor having a collector terminal, and a means for implementing a soft start function between said input terminal and a connection joint, where said connection joint is in electrical connection with said secondary winding, said gate terminal and said collector terminal; and said means for implementing said soft start function either comprises a first resistor, a second resistor and a capacitor having a first terminal and a second terminal, with said first terminal of said capacitor being connected between said first resistor and said second resistor and said second terminal of said capacitor being connected to the ground, or comprises a resistor and an inductance, said resistor being connected to said inductance in series.

5. The isolating type self-oscillating flyback converter of claim 4, wherein said means for implementing said soft start function comprises a first resistor, a second resistor and a capacitor having a first terminal and a second terminal, with said first terminal of said capacitor being connected between said first resistor and said second resistor and said second terminal of said capacitor being connected to the ground.

6. The isolating type self-oscillating flyback converter of claim 4, wherein said means for implementing said soft start function comprises a resistor and an inductance, said resistor being connected to said inductance in series.

* * * * *